United States Patent

Hansson et al.

[11] Patent Number: 5,946,172
[45] Date of Patent: Aug. 31, 1999

[54] INSTALLATION FOR POWER TRANSMISSION BY MEANS OF HIGH-VOLTAGE DIRECT CURRENT, COMPRISING DEVICE FOR DETECTION OF A PERMANENT GROUND FAULT

[75] Inventors: Erik Hansson; Mats Hyttinen; Per Miram, all of Ludvika, Sweden

[73] Assignee: Area Brown Boveri AB, Vasteras, Sweden

[21] Appl. No.: 09/011,188

[22] PCT Filed: May 26, 1997

[86] PCT No.: PCT/SE97/00856

§ 371 Date: Apr. 28, 1998

§ 102(e) Date: Apr. 28, 1998

[87] PCT Pub. No.: WO97/45905

PCT Pub. Date: Dec. 4, 1997

[30] Foreign Application Priority Data

May 29, 1996 [SE] Sweden .................................. 9602061

[51] Int. Cl.[6] .................................................... H02H 3/00
[52] U.S. Cl. .................................. 361/42; 361/71; 361/72; 361/86
[58] Field of Search ........................... 361/42, 59, 71–75, 361/78–79, 86, 93–94

[56] References Cited

U.S. PATENT DOCUMENTS 5,303,112  4/1994  Zulaski et al. ............................. 361/67

FOREIGN PATENT DOCUMENTS 1494107  7/1989  U.S.S.R. .
1557625  4/1990  U.S.S.R. .
WO 95/10815  4/1995  WIPO .

OTHER PUBLICATIONS

Uhlmann, Power Transmission by Direct Current, Berlin Heidelberg New York, 1975, p. 221.
Cory et al., High Voltage Direct Current Convertors and Systems, London 1965, pp. 131–132.
Arrilaga, High Voltage Direct Current Transmission, Peter Peregrinus Ltd. (7.3–7.12), London 1983, pp. 173–175.
Kimbark, Direct Current Transmission, vol. 1 Wiley Interscience, 1971, pp. 272–276.

Primary Examiner—Jeffrey Gaffin
Assistant Examiner—Michael J. Sherry
Attorney, Agent, or Firm—Pollock, Vande Sande & Amernick

[57] ABSTRACT

An installation for power transmission by high-voltage direct current has at least two converter stations which are interconnected by a dc line (DC), at least one station (SR1) having a line protection device (LP) adapted to detect a ground fault on the dc line and, when a ground fault is detected, to achieve a reduction of the voltage ($U_D$) and the current ($I_D$) of the line and thereafter to make a restart attempt. The installation has, in addition, a detection circuit (FD) for detection of a permanent low-impedance ground fault on the dc line. The detection circuit is activated after an intervention by the line protection device. During a detection interval, the detection circuit causes one of the stations (SR1) to feed a current into the line. The detection circuit senses the line voltage, compares the growth of the line voltage with the corresponding expected growth in case of a faultless line and prevents a restart of the installation if the sensed voltage growth is smaller than the expected growth.

6 Claims, 5 Drawing Sheets

INSTALLATION FOR POWER TRANSMISSION BY MEANS OF HIGH-VOLTAGE DIRECT CURRENT, COMPRISING DEVICE FOR DETECTION OF A PERMANENT GROUND FAULT

TECHNICAL FIELD

The present invention relates to an installation for power transmission by means of high-voltage direct current (HVDC installation) comprising two converter stations inter-connected by means of a dc line, wherein at least one station has a line protection device adapted to 1 detect ground faults on the dc line, in which case a criterion of ground fault is that the line voltage falls below a predetermined level during a predetermined first time interval, and 2 in the event of a detected ground fault, to bring about a reduction of the voltage and the current of the line and, thereafter, to make a restart attempt.

BACKGROUND OF THE INVENTION

An HVDC installation usually has two converter stations. The converters in one station normally operate as rectifiers and the converters in the other station as inverters. If a ground fault occurs on the dc line in such an installation, this is detected by a line protection device. Such protection devices are well known. A typical line protection device makes use of two criteria for detection of a ground fault. The derivative part of the line protection device indicates a ground fault if the direct voltage decreases to a low level but at a certain speed (possibly it is also required that the direct current increases). The level part of the protection device indicates a ground fault if the direct voltage falls below a low limit value for a certain minimum period of time. This time has to be chosen so low, for example 150–300 ms, that unjustified ground-fault indications are not obtained during normal switching processes or during such other disturbances, for example loss of the alternating voltage of one of the stations, which also give rise to a low direct voltage.

When the line protection device indicates a ground fault on the dc line, the rectifier is controlled in a known manner to inverter operation, and the current and voltage of the line are reduced to zero. After a certain time, a restart attempt is then made. This time is so chosen (e.g. 100–200 ms) that arcs which occur during temporary ground faults on an overhead line should have had time to become extinguished and deionized. During a restart attempt, the voltage and current of the line are increased. If the fault no longer remains, normal operation is resumed. If the fault remains, the protection device reacts again. Usually, a certain number of restart attempts are made, whereupon, in case of a remaining fault, the operation of the installation (or the pole concerned) is interrupted.

Installations of the above kind are previously known from, for example,

Uhlmann: "Power Transmission by Direct Current" Berlin Heidelberg New York 1975, e.g. p. 221

Cory et al: "High Voltage Direct Current Convertors and Systems" London 1965, e.g. pp. 131–132

Arrilaga: "High Voltage Direct Current Transmission" London 1983, e.g. pp. 173–175

Kimbark: "Direct Current Transmission" New York 1971, e.g. pp. 272–276.

A dc line in an HVDC installation may comprise an overhead line or a cable or, perhaps more often, partially an overhead line and partially a cable. Ground faults on an overhead line are often temporary. In the event of such faults, it is desirable to resume normal operation as quickly as possible, and this can be done with minimum disturbance of the operation in the manner described above. Ground faults on a cable, on the other hand, are normally permanent. Making one or more restart attempts during such a ground fault is ineffective. The restart attempt or attempts only delay(s) the definite interruption of the operation. Further, during the restart attempts repeated high currents are fed through the location of the fault, each time for a relatively long time (such a long time that the line protection device has time to trip). This entails, on the one hand, a risk of additional damage of the cable, and on the other hand, heavy disturbances in alternating-voltage networks connected to the installation, and especially in weak networks.

SUMMARY OF THE INVENTION

The object of the invention is to provide an installation of the kind described above, which makes possible a rapid and reliable detection of permanent low-impedance ground faults on the dc line, and, in particular, of cable faults, whereby unnecessary restart attempts with the drawbacks mentioned above can be avoided.

What characterizes an installation according to the invention will become clear from the appended claims.

BRIEF DESCRIPTION OF THE DRAWINGS

The invention will be described in greater detail in the following with reference to the accompanying drawings wherein.

FIG. 4a shows the case where the ground fault is a cable fault, that is, a low-impedance permanent ground fault. FIG. 4b shows the case where the ground fault is a temporary fault, for example a temporary flashover on an overhead line.

DETAILED DESCRIPTION OF THE PREFERRED EMBODIMENTS

Figure 1:
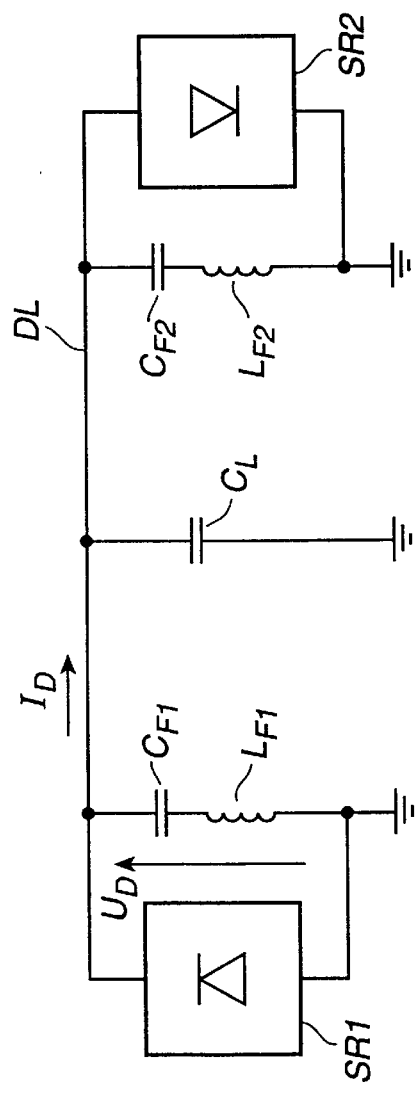
FIG. 1 schematically shows an example of an HVDC installation according to the invention with two converter stations interconnected by a dc line.

FIG. 1 schematically shows an example of an installation according to the invention. It comprises two converter stations, each with a converter, SR1 and SR2, respectively, and with a filter circuit with a capacitance, CF1 and CF2, respectively, and an inductance, LF1, and LF2, respectively. The stations are interconnected by means of a dc line DL. The line DL is assumed to consist of a combination of overhead lines and cable, for example a submarine cable, which at each end is connected via an overhead line to the respective converter station.

The line voltage $U_D$ is assumed during undisturbed operation to be positive relative to ground and the line current $I_D$ is assumed to have the direction shown in the figure. Thus, the converter SR1 operates as a rectifier and the converter SR2 as an inverter.

Ground faults occurring on the line may thus consist of temporary ground faults on an overhead line as well as of permanent ground faults on a cable. In the former case, a restart to full power should be made as quickly as possible after an intervention by the line protection device. In the latter case, for the reasons stated above, unnecessary attempts at a restart should be avoided and the feeding of current to the line after the intervention of the line protection device should be kept at a minimum. This is achieved by providing the installation with the means described below for detection of low-impedance permanent cable faults and for inhibiting a restart upon such a detected fault.

Figure 2:
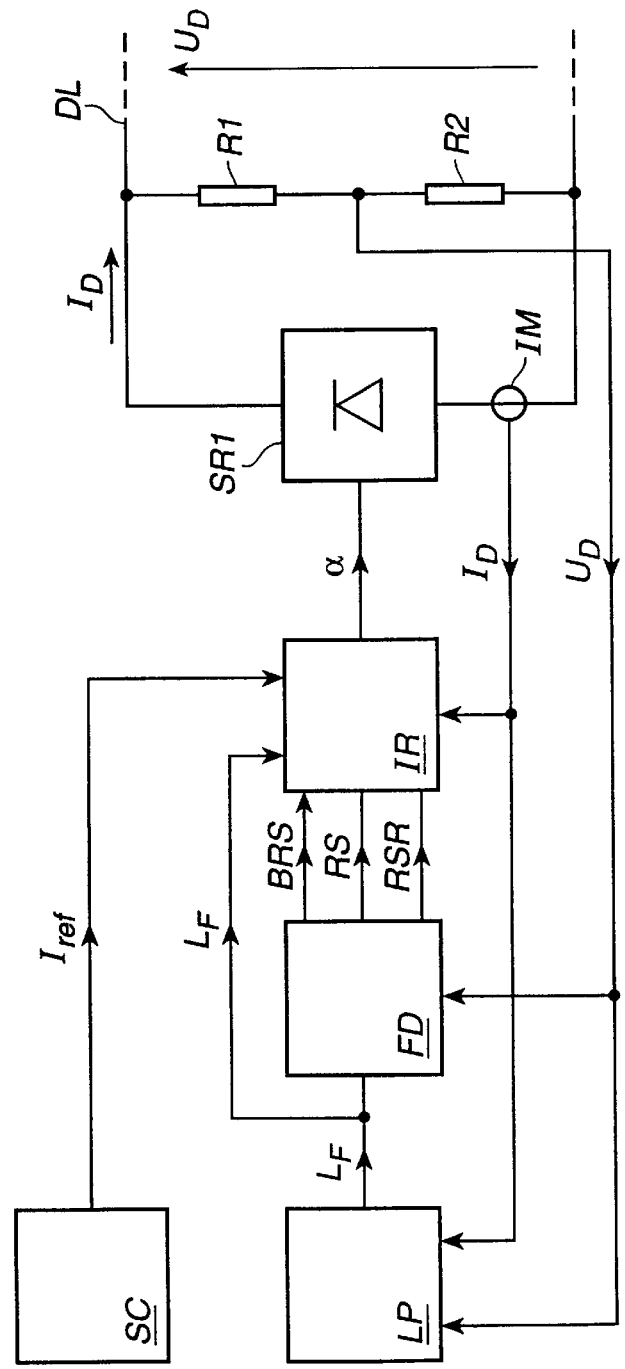
FIG. 2 shows the fundamental configuration of the control system in the station operating as a rectifier in the installation according to FIG. 1.

FIG. 2 schematically shows relevant parts of the control system for the converter station which comprises the converter SR1 operating as a rectifier. In a known manner, the two converter stations have identical control systems to make possible alternation of the power direction, and each control system is switchable for rectifier operation and inverter operation, respectively. The line protection device and the detection member according to the invention are only connected into the rectifier station, and therefore only the control system for this station is shown. The control system for inverter operation may operate in a completely conventional manner.

A superordinate system SC supplies a current reference $I_{ref}$ to a current controller IR. A current measuring device IM delivers the current measurement signal $I_D$ to the controller, which depending on the deviation between the actual value of the current and the reference value to the converter SR1, delivers a signal $\alpha$ which determines the control angle of the converter and hence its direct voltage. A line protection device LP of a known type is supplied with the current measurement signal $I_D$ as well as the voltage measurement signal $U_D$ from a measuring voltage divider R1–R2. The line protection device delivers an indicating signal LF if at least one of the following two criteria is fulfilled the line voltage decreases to a low level at a rate exceeding a predetermined value, the line voltage is below a certain low level for at least a predetermined period of time.

The signal LF is supplied to the current controller IR which thus, during a ground fault, controls the converter to full inverter operation, whereby the line current and the line voltage rapidly decrease to zero. After a certain time, for example 150 ms, the signal LF becomes zero, which constitutes a signal to the current controller to restart operation. This is done in a known manner by setting the control angle $\alpha$ at a predetermined initial value, for example 60°, whereupon the current controller increases the voltage and current of the line to the values prevailing before the ground fault. Usually, the control systems of the converters are provided with a so-called voltage-dependent current limit, that is, at a direct voltage lower than, for example, 10% of the rated voltage, the current reference is automatically reduced to, for example, about 30% of the rated current. In this way, therefore, the restart will first take place at a lower current until a certain direct-voltage level has been attained, whereupon the installation is increased to the current determined by the current reference.

According to the invention, the control system is provided with means for detecting low-impedance permanent cable faults, and these means consist of the detector circuit FD. The detector circuit FD, the configuration and function will be described in the following with reference to FIG. 3, is supplied with the indicating signal LF from the line protection device and the voltage measurement signal $U_D$, and the circuit delivers to the current controller IR the following three signals a signal BRS which interrupts a restart upon detection of a cable fault, a restart signal RS which instantaneously adjusts the output signal of the current controller to the value corresponding to the restart reference of the control angle, a restart reference RSR which indicates the control angle with which the restart is initiated.

Figure 3:
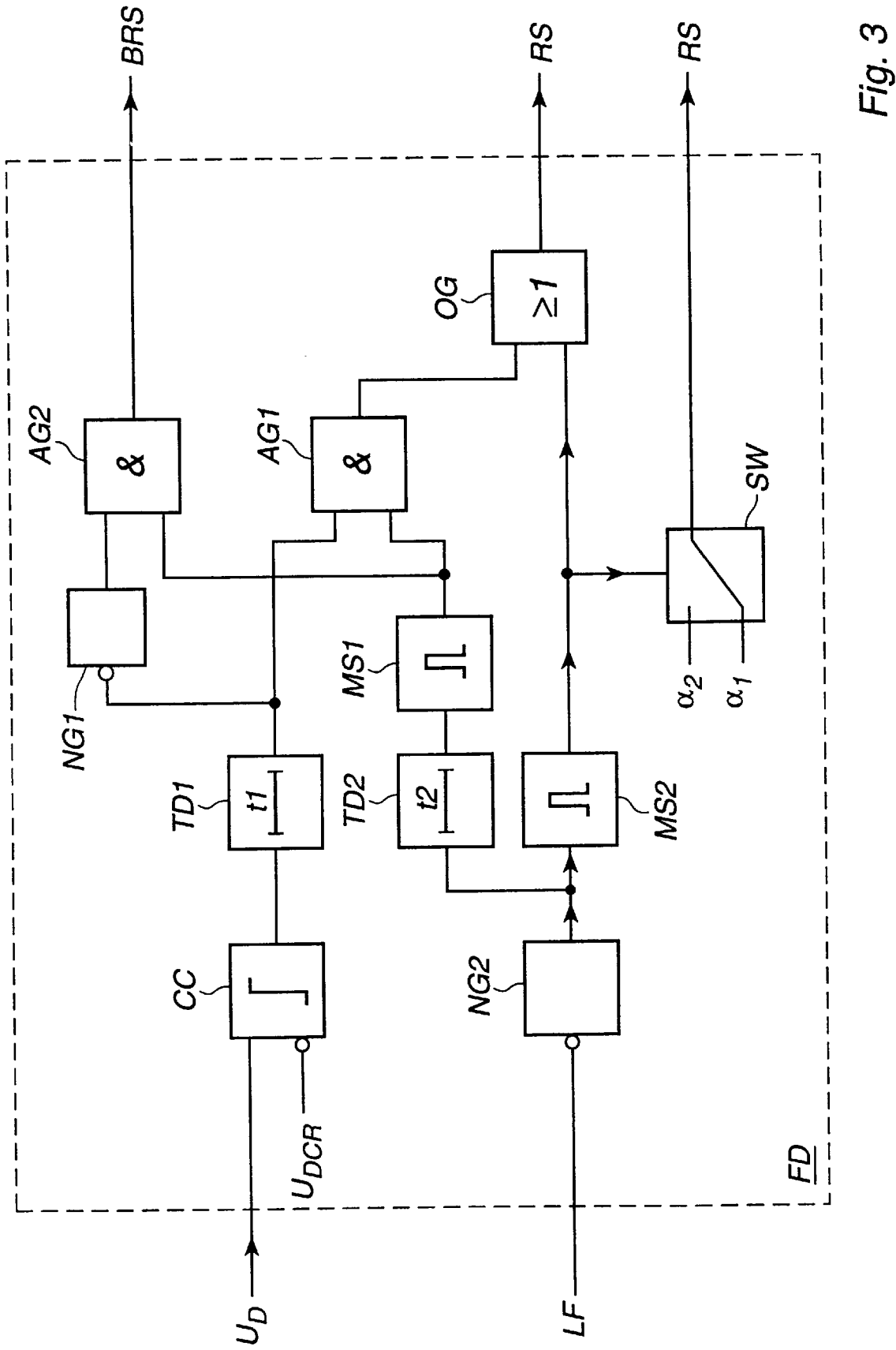
FIG. 3 shows in more detail the configuration of the detection means in the control system shown in FIG. 2.

FIG. 3 shows the configuration of the detector circuit FD. It is supplied with the signal LF from the line protection device. This signal becomes 0 when a suitable deionization time, for example 150 ms, has lapsed after an intervention by the line protection device. The output signal of an inverting circuit NG2 then becomes 1. This signal is supplied to a monostable circuit MS2 which delivers a short pulse (e.g. 4 ms) to an OR circuit OG. From this circuit a corresponding output signal RS is then obtained, which instantaneously adjusts the output signal of the current controller, that is the control angle $\alpha$ of the converter, to the value which is indicated by the signal RSR—the restart reference. This signal may be switched between two values by the switch SW. Normally, the signal has the value $\alpha_1$, for example about 60°. During a restart after a ground fault on the dc line, however, the switch SW adjusts the signal to a value $\alpha_2$, for example about 85°, which corresponds to a lower direct voltage than that corresponding to the control angle $\alpha_1$. In this way, a very low voltage and current are obtained at the beginning of a restart after a line fault.

The output signal from the circuit NG2 is further supplied to a delay circuit TD2, the output signal of which becomes 1 after the time t2. This time is considerably shorter, for example 30 ms, than the delay time, for example 150–300 ms, of the level-sensing part of the line protection device. After the time t2, the monostable circuit MSI delivers a short pulse (e.g. 4 ms) to one input of an AND circuit AG1 and to one input of an AND circuit AG2.

A level flip-flop CC is supplied with the voltage measurement signal $U_D$ and a voltage reference signal $U_{DCR}$. The latter is so chosen that, with a suitable safety margin, it falls below the voltage $U_{DL}$ which a faultless line would have after the time t2. This voltage is determined substantially by, on the one hand, the capacitance of the line (normally substantially that of the cable) together with the capacitances of the filter circuits and, on the other hand, by the current-time area fed to the line during the time t2 according to the relationship $$U_{DL} = \frac{\int I_D dt}{C_L + C_{F1} + C_{F2}}$$

The fed-in current-time area is determined by the known properties of the current controller and by the chosen values of the restart reference $\alpha_2$, the current reference prevailing at the beginning of the restart and the duration t2 of the current pulse. The voltage value $U_{DL}$ can be calculated with the aid of these data and of the known capacitances or be determined through tests. In the embodiment now described, the voltage reference $U_{DCR}$ was chosen to be 10% of the rated direct voltage. If $U_D > U_{DCR}$ the output signal 1 is obtained from the circuit CC. This signal is delayed for the time t1, for example 4 ms, in a delay circuit TD1, that is, only if $U_D > U_{DCR}$ for at least the time t1, an output signal 1 is obtained from the circuit TD1. This signal is supplied to a second input of the AND circuit AG1 and, via an inverting circuit NG1, to a second input of the AND circuit AG2.

When the indicating signal LF of the line protection device becomes 1 after the predetermined deionization time, the control angle of the converter is thus adjusted to the value $\alpha_2$ (e.g. 85°). The converter initiates the restart with low voltage, and a smooth restart is obtained with low voltage and current during the first stage. From the circuits TD2 and MS1, a short pulse is obtained to the AND circuits AG1 and AG2 after 30 ms. In the circuit CC, the line voltage is compared with the reference $U_{DCR}$ and when the line voltage has exceeded the reference for at least 4 ms, the output signal 1 is obtained from the circuit TD1 to the two AND circuits.

If the ground fault was a temporary flashover or some other high-impedance fault in the overhead line, the line voltage will increase so rapidly that, at the end of the measurement interval (30 ms), it will exceed the reference $U_{DCR}$. When at the end of the measurement interval the pulse from MD1 is delivered, a short pulse will therefore be supplied from the AND circuit AG1 to the OR circuit OG and the current controller receives a short signal RS which sets the control angle of the converter at the value given by the restart reference RSR. After the short pulse from MS2, the switch SEW has returned to its normal position, and the restart reference therefore now has the normal value $\alpha_1$ (e.g. 60°). The restart thus continues from here as a normal restart. The current is first limited to the value given by the voltage-dependent current limit, for example 30% of the rated current. When the line voltage has reached a certain level, this limitation is cancelled, and the line voltage and the current increase to the values they had before the intervention of the line protection device.

If, on the other hand, the ground fault is a cable fault, the fault is in all probability a low-impedance and permanent fault. The ground fault prevents the build-up of any mentionable voltage in the line. At the end of the measurement interval, therefore, the line voltage is lower than the reference $U_{DCR}$ and the output signal from the circuit TD1 is 0. Thus, no output signal is obtained from the circuit AG1 but, on the other hand, from AG2 which supplies the signal BRS to the current controller. This signal brings the controller to immediately control the converter to full inverter operation, that is, the line current and voltage are reduced as quickly as possible to zero. During the short measurement interval, only a low current has been fed into the fault location of the cable, and the risk of additional cable damage or disturbances in the alternating-voltage networks connected to the installation tion is greatly reduced or completely eliminated.

Figure 4A:
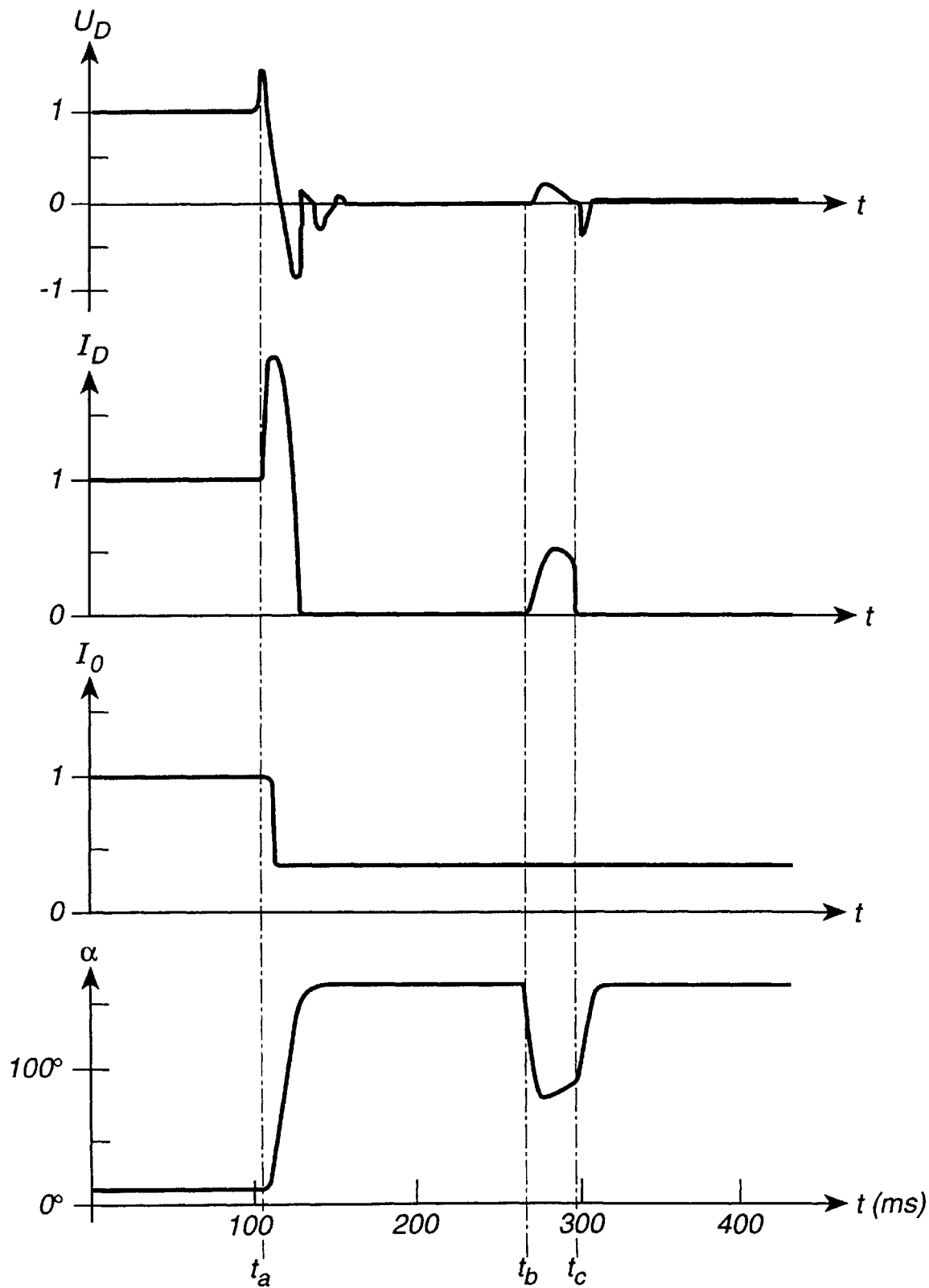
FIGS. 4a and 4b show the behaviour of some representative variables in the installation shown in FIGS. 1–3 during the time immediately after a ground fault detected by the line protection device.

FIG. 4a shows an example of the mode of operation of the installation in case of a ground fault on the cable. The figure shows, as a function of time, the direct voltage $U_D$, the line current $I_D$, the current order $I_O$ and the control angle $\alpha$ of the rectifier. In the three upper diagrams, the rated voltage and the rated current are designated 1,0. At t=0, the installation operates with full voltage and current. At $t=t_a$, the line protection device detects a ground fault on the line, the rectifier is controlled to full inverter operation, the line current is reduced after the initial current surge to zero, the line voltage drops to zero, and the current order is reduced to about 30% of the rated current. After a deionization time of about 150 ms, at $t=t_b$, the rectifier voltage is increased to a low direct voltage ($\alpha=85°$) and a current pulse is injected on the line during a measurement interval of about 30 ms. At the end of the measurement interval, at $t=t_c$, the detection circuit according to the invention and described above determines that the line voltage has not increased to the value to which it would have increased in case of a faultless line, the restart is interrupted, the rectifier is controlled to full inverter operation and rapidly reduces the current to zero.

Figure 4B:
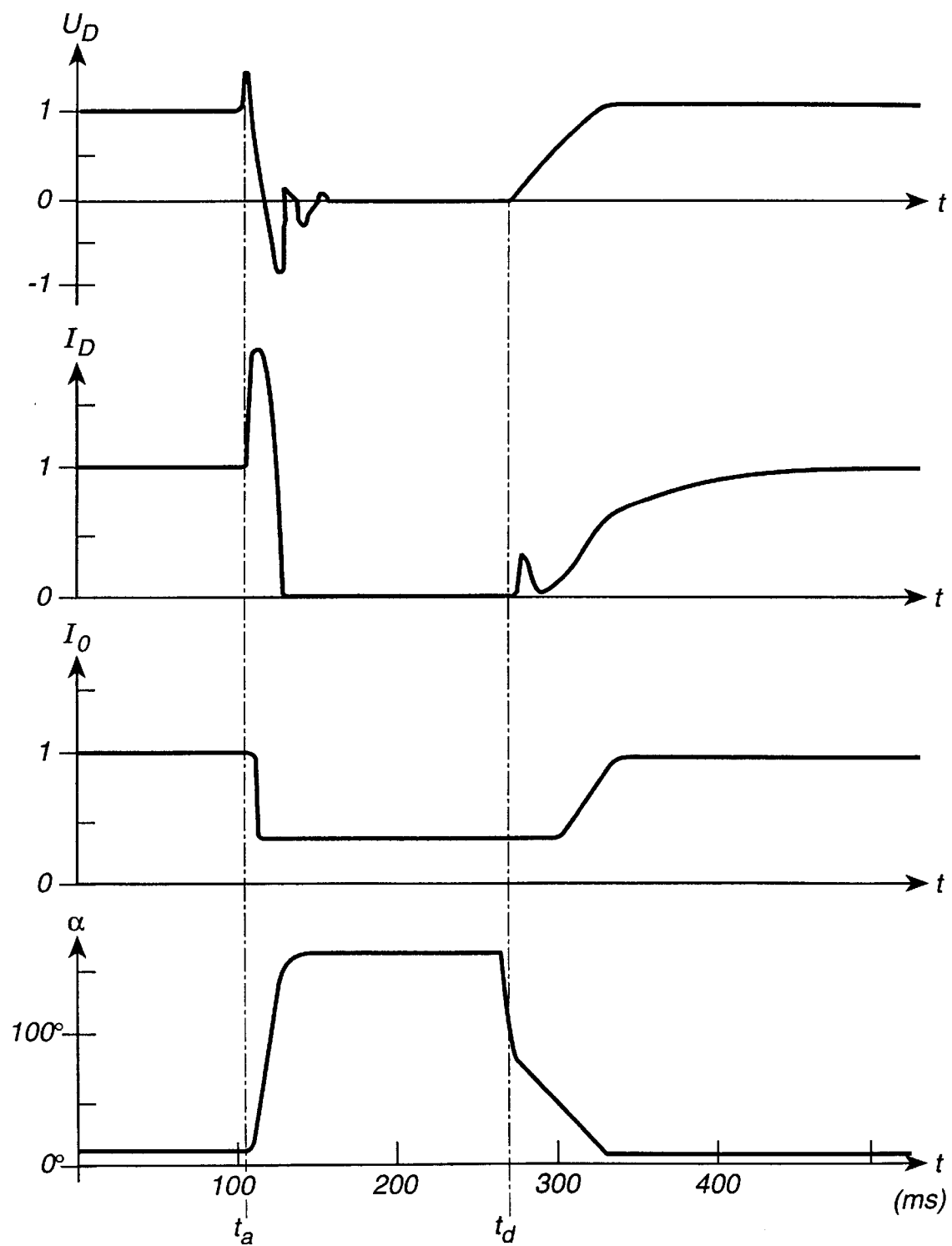

FIG. 4b shows the corresponding quantities in case of a ground fault which is a temporary flashover on an overhead line. At $t=t_d$, the rectifier voltage is increased to a low direct voltage in the same way as in FIG. 4a. Since the fault is assumed to have disappeared during the deionization time, at the end of the measurement interval the line voltage has reached the value which a faultless line should have after the current-time area injected during the interval, thus and the restart continues, whereby the line voltage and current successively rise towards the values which prevailed before the ground fault (the current order is increased to the original value as soon as the direct voltage has risen to the limit value given therefor).

Figure 5:
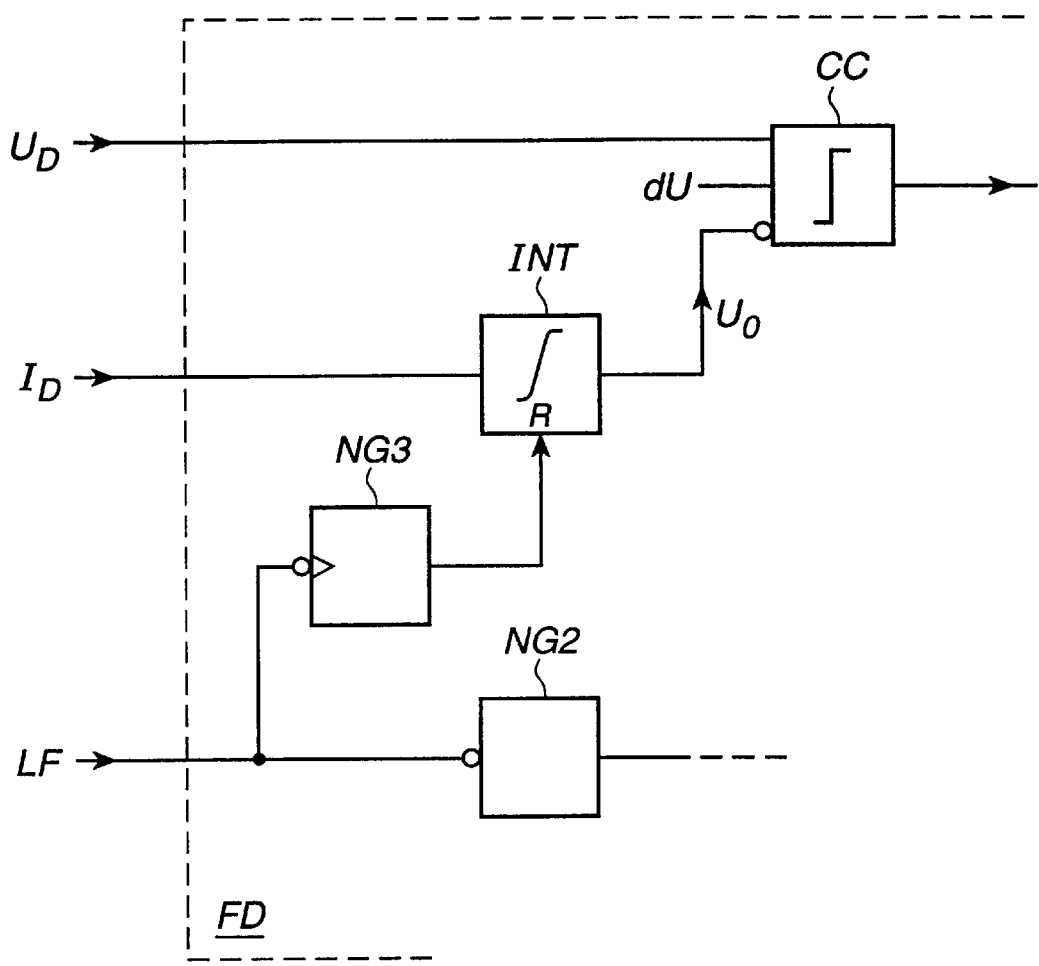
FIG. 5 shows an alternative embodiment of an installation according to the invention where the current-time area, fed to the line during a measurement interval, is formed by integration of the current during the interval, and the actual line voltage is compared with the voltage which the current-time area would have given rise to in case of a faultless cable.

FIG. 5 shows an alternative embodiment of that part of the detection circuit FD which compares the growth of the line voltage during the measurement interval with the voltage growth for a faultless line. An integrator INT is supplied with the current measurement signal $I_D$. When the output signal LF of the line protection device becomes 0, the integrator is reset with the aid of an inverting circuit NG3, the output signal of which is supplied to the reset input R of the integrator. The output signal $U_0$ of the integrator $U_0$ is proportional to the current-time area fed into the line during the measurement interval, and its proportionality factor is chosen so that the signal corresponds to the line voltage that the current-time area would give across the line capacitance according to the equation above. The signal $U_0$ is compared in the level flip-flop CC with the sensed line voltage $U_D$, whereby a positive margin quantity dU is supplied to the flip-flop CC to give a suitable margin during the detection. Otherwise, the detector circuit operates as the circuit described with reference to FIG. 3.

The embodiments described above are only examples, and an installation according to the invention may be formed in a large number of other ways. Thus, a monopolar two-station transmission has been described above, whereas the invention may also be used with bipolar transmissions and with multistation transmissions.

In the example above a length of 30 ms has been stated for the measurement interval ($t_b$–$t_c$ in FIG. 4a). This time should be considerably shorter than the delay time for the level-sensing part of the line protection device. It has been found that this time should be below 100 ms and preferably not exceed 50 ms in order to obtain the advantages of the invention including rapid detection of cable faults and reduced risk of cable damage and network disturbance. For the same reason, the current during the measurement interval should be as low as possible, whereby measurement time and current should be adapted so that the current-time area during the measurement interval becomes so large, but preferably not substantially larger, that it allows a safe and sufficiently rapid detection of cable faults. The current during the measurement interval may be kept at a low value in the manner described above with a combination of an especially low direct voltage at the beginning of the restart and with a current limit which is reduced at a low direct voltage. Alternatively, however, the current may be limited in other ways, for example by connection during the measurement interval of a special and low current reference.

The control and detection circuits in an installation according to the invention may be designed so that additional restart attempts are inhibited in the event of a detected cable fault, or so that, even in the event of a detected cable fault, a certain number of restart attempts are allowed before the installation (or the faulty pole) is blocked.

According to the invention, the growth of the line voltage is compared with the expected voltage growth at a faultless line. It has been described above how this is done by comparing the line voltage, after a predetermined time, with a fixed reference level or a reference level calculated from the current-time area. Alternatively, however, the comparison can be made in other ways within the scope of the invention. For example, the duration of the measurement interval need not be constant, but the measurement may be interrupted either as soon as (in case of a faultless line) the sensed voltage reaches a reference value, or (in case of a cable fault) the line voltage does not, within a certain upper time limit, reach the reference value.

We claim:

1. An installation for power transmission by means of high-voltage direct current (HVDC installation), comprising at least two converter stations (SR1, SR2) which are interconnected by a dc line (DL), at least one station having a line protection device (LP) adapted to 1) detect a ground fault on the dc line, and 2) when a ground fault is detected, to achieve a reduction of the voltage ($U_D$) and the current ($I_D$) of the line and thereafter to make a restart attempt, wherein the criterion of ground fault in the line protection device is that the line voltage ($U_D$) falls below a predetermined level during a predetermined first time interval, the installation, in addition, has a detection circuit (FD) for detection of a permanent ground fault on the dc line, the detection circuit is adapted to be activated after an intervention by the line device, and the detection circuit is adapted to detect a permanent ground fault by causing one of the stations (SR1), during a detection interval ($t_b$–$t_c$) which is shorter than said first time interval and of a duration which is shorter than 100 ms, to feed into the line a current which is considerably lower than the rated current of the line, to sense the line voltage, to compare the growth of the line voltage with a corresponding expected voltage growth in case of a faultless line and, if the sensed voltage growth is smaller than the expected growth, to prevent a restart of the installation.

2. An installation according to claim 1, wherein the detection interval ($t_b$–$t_c$) has a predetermined length, and the detection circuit is adapted, at the end of the detection interval, to compare the line voltage ($U_D$) with a voltage reference value ($U_{DCR}$) and to prevent a restart if the sensed line voltage falls below the voltage reference value.

3. An installation according to claim 2, wherein the voltage reference value is chosen in dependence on the total capacitance ($C_L$+$C_{F1}$+$C_{F2}$) of the line and the current-time area ($\int I_D\, dt$) fed into the line during the detection interval ($t_b$–$t_c$).

4. An installation according to claim 3, wherein the detection circuit comprises members (INT, NG3) adapted, during the detection interval ($t_b$–$t_c$), to sense the current ($I_D$) fed into the line and to form the time integral ($\int I_D\, dt$) of the current.

5. An installation according to claim 1 wherein a control system is adapted, after an intervention by the line protection device (LP), to initiate a restart, and the detection circuit (FD) is adapted to be activated at the beginning of the restart and, if the sensed voltage growth is smaller than the expected growth, to interrupt the restart.

6. An installation according to claim 5, wherein a converter (SR1), operating as a rectifier of said converter station, has a control means (FD, IR) adapted to initiate a restart with a predetermined first value ($\alpha_1$) of the control angle ($\alpha$) of the converter, and the control system is adapted, after an intervention by the line protection device (LP), to initiate a restart with a predetermined second value ($\alpha_2$) of the control angle of the converter, which second value is chosen to correspond to a lower direct voltage than said first value ($\alpha_1$).

* * * * *